(12) United States Patent
Hamann et al.

(10) Patent No.: US 6,729,549 B2
(45) Date of Patent: May 4, 2004

(54) SYSTEM AND METHOD FOR PERSONALIZATION OF SMART CARDS

(75) Inventors: Ernst-Michael Hamann, Boeblingen (DE); Klemens Klaffke, Boeblingen (DE); Robert Sulzmann, Holzgerlingen (DE)

(73) Assignee: International Business Machines Corporation, Armonk, NY (US)

(*) Notice: Subject to any disclaimer, the term of this patent is extended or adjusted under 35 U.S.C. 154(b) by 127 days.

(21) Appl. No.: 10/015,251

(22) Filed: Dec. 12, 2001

(65) Prior Publication Data

US 2002/0117542 A1 Aug. 29, 2002

(30) Foreign Application Priority Data

Dec. 19, 2000 (EP) ............................................. 00127787

(51) Int. Cl.[7] ................................................ G06K 19/06
(52) U.S. Cl. ....................... 235/492; 235/380; 235/379; 235/449
(58) Field of Search ................................ 235/492, 380, 235/383, 379

(56) References Cited

U.S. PATENT DOCUMENTS

| | | | | |
|---|---|---|---|---|
| 4,755,660 A | * | 7/1988 | Nakano | 235/380 |
| 5,684,742 A | * | 11/1997 | Bublitz et al. | 365/189.01 |
| 5,923,884 A | * | 7/1999 | Peyret et al. | 717/167 |
| RE36,310 E | * | 9/1999 | Bjerrum et al. | 380/25 |
| 6,014,748 A | * | 1/2000 | Tushie et al. | 713/200 |
| 6,196,459 B1 | * | 3/2001 | Goman et al. | 235/380 |
| 6,202,155 B1 | * | 3/2001 | Tushie et al. | 713/200 |
| 6,317,832 B1 | * | 11/2001 | Everett et al. | 713/172 |
| 6,367,011 B1 | * | 4/2002 | Lee et al. | 713/172 |
| 6,402,028 B1 | * | 6/2002 | Graham et al. | 235/380 |
| 6,516,357 B1 | * | 2/2003 | Hamann et al. | 710/2 |
| 6,575,360 B1 | * | 6/2003 | Hagn | 235/380 |
| 6,588,673 B1 | * | 7/2003 | Chan et al. | 235/492 |

FOREIGN PATENT DOCUMENTS

DE 936530 A1 * 2/1998

* cited by examiner

Primary Examiner—Karl D. Frech
Assistant Examiner—Daniel Walsh
(74) Attorney, Agent, or Firm—Duke W. Yee; A. Bruce Clay; Stephen R. Tkacs

(57) ABSTRACT

Virtual smart cards (VSC) are generated by a VSC control program with each VSC addressable by a unique identifier (ID). Using the VSC control program, personalized VSC data is accessed via a secure channel using the ID and a password. A real smart card is personalized by a personalization program that reads data from the VSC. Personalization data contained in the VSC may be tested in an application environment before a personalized real smart card is available.

16 Claims, 5 Drawing Sheets

SYSTEM AND METHOD FOR PERSONALIZATION OF SMART CARDS

The present invention is related to a method and system for personalization of smart cards, especially when the collection and creation of the personalization data objects and the personalization of smart cards take place at different locations.

BACKGROUND OF THE INVENTION

Increasing numbers of organizations which issue transaction cards to their users, customers, or employees require cards tailored to meet the requirements of their particular service or application. These organizations also want the cards to contain data about the cardholder. Existing transaction cards encode such data in a magnetic stripe on the back of the card but the amount of data that can be held by a magnetic stripe is limited. A new type of transaction card (so called smart cards) embeds a microprocessor computer chip in the plastic of the card to greatly increase the card's data storage capacity. Additionally, sophisticated card applications specific to the card issuer can execute in certain varieties of the chips, and the chip may also contain a type of operating system.

Transaction cards with embedded chips are referred to in the industry as portable programmed data carriers, more commonly called "smart cards" (the term, smart card" used in the present invention also covers any programmed data carrier used in any portable device, like handy, digital personal assistant etc., to securely hold subscriber specific information). The chip in a smart card is programmed with initialization and/or personalization data.

The initialization data comprises three major types of information: application data, security data, and printed data. The application data is common to all cards for a given card application and includes application program code and variables. The security data prevents fraudulent use of the card and is usually provided in the form of "secure keys".

Smart cards are also programmed with information specific to an individual cardholder through a process called "personalization". The personalization information for a smart card is similar to the personalization information currently contained on non-smart cards, such as the cardholder's name, account number, card expiration date, and so on. Because of its increased storage capacity, the chip in a smart card can contain additional data beyond the basic information on the standard transaction card including a graphical representation of the individual's signature, data defining the types of service the cardholder is entitled to, and account limits for those services.

Personalization of a smart card normally requires that the card issuer collects the personalization data and prepares the personalization records in specific data files. The personalization records are in a format, that depends on the card personalization program, preferably used at the personalization side, e.g. by the card manufacturer.

Each personalization record for a smart card contains at least data objects concerning the smart card holder and additionally a smart card identifier (ID).

An example for a typical structure of a personalization record is as follows:
Smart card ID, surname, name, street, zip, city Another part of the personalization data is the description on which address the data objects of each personalization record is written into the EEPROM of the smart card. This description is called personalization table.

An example of the personalization table is as follows:

| | | |
|---|---|---|
| 69 13 | /* Record type | */ |
| 6A 0D | /* Record length | */ |
| 6B A608 | /* Personalize EEPROM | */ |
| 6D 00 | /* Protection: None | */ |
| 6E 00 | /* P2 | */ |
| 6F 06 | /* Data length in command | */ |
| 70 027A | /* Data address | */ |
| 72 0004 | /* Data length in personalization data set | */ |
| 74 0000 | /* Index in personalization data set | */ |
| 76 9000 | /* Good return code | */ |

The personalization table contains the smart card commands to personalize data objects on a specific address and additionally an index pointing to a column within the personalization record.

The personalization record and personalization table are sent to the personalization side on a tape, floppy disk or via network.

The personalization side transfers the personalization records using personalization table with the personalization program to the smart card. This is done by generating smart card type specific APDUs (Application Protocol Data Units) using personalization table and merging the respective data object. The APDUs are sent to the operating system of the smart card.

The personalization program must be configured for different card operating systems to communicate to different smart card types.

Thus for each set of card in mass production, a static file layout for the data objects to be personalized is given. Inside the static file, there are dedicated addresses where data objects are to be placed.

To personalize data objects on a smart card, a static file layout for these data objects is given.

Changing objects, e.g. changing size of a data object to be personalized, require a change of the static file layout of the personalization program. This will generate effort by the smart card issuer because the personalization tables and personalization records must be changed, too.

Personalization of different data objects is difficult. Each set of cards have the same static file structure and requires the same file structure layout of the personalization program. No decentralized personalization is possible without the personalization program.

Personalization data cannot be tested in a real application environment.

In summary, a smart card issuing system must be tailored to meet the requirements of a specific card application that will be programmed on a specific type of smart card under the control of a specific card operating system and to format the data for the card to be compatible with a specific type of personalization equipment chosen to issue the card. The entire issuing system must be re-configured whenever any one of these variables (issuer application, smart card/card operating system, and/or personalization equipment) is changed, increasing the time and cost incurred by the issuer of the card in delivering personalized smart cards to its customers.

Furthermore, the smart card issuing systems in use today utilize a proprietary approach developed by either the card manufacturer or the personalization equipment manufacturer. To encourage sales of their respective cards or equipment, each manufacturer develops a unique personalization solution for a particular card application, and each solution is specific to a particular card issuer.

These unique solutions are intended to optimize performance of the cards or equipment and thus do not permit a more inclusive, generalized personalization process that accepts any card operating system and/or work with any personalization equipment.

U.S. Pat. No. 6,014,748 discloses a smart card personalization system which contains a database containing card issuer data format templates, card applications, card operating systems commands, and personalization equipment specification and provides a centralized interface of inputs and outputs to a card issuing process which dynamically adjusts to changes in the issuing process to easily permit a card issuer to change data formats, card applications, card operating systems and/or personalization equipment in the card issuing process. The system interfaces to any card issuer management system, manages transfer of cardholder data and card applications to the particular personalization equipment used, maintains statistics for real-time and off-line inquiries to support critical management and reporting functions. A disadvantage of such system is that personalized smart cards may only be tested in their application environment when the personalization of the smart card is already finished. Errors in the personalization process may require several insertions of the respective smart card into the reader and repeating the personalization process again. This may be very time consuming and expensive.

Furthermore data objects used within the personalization process are not concurrently provided by the smart issuer side to the personalization side with the result that the personalization process can take some time requiring several insertions of the smart card into the reader. This may be also very time consuming and expensive.

SUMMARY OF THE INVENTION

It is therefore an object of the present invention to provide an improved method and system for personalization of smart cards avoiding disadvantages of the prior art personalization systems.

This object is solved by the features of the independent claims. Preferred embodiments of the present invention are laid down in the subclaims.

The present invention discloses a system and method for personalization of smart cards by using virtual smart cards (VSC) containing all data objects (card holder specific data objects) required to personalize real smart cards. The VSC is a software implemented version of a real smart card providing the equivalent functionality of a real smart card. The VSC is generated and used by a VSC control program handling the generation, the security and the read/write process of the VSC.

VSCs being generated by the VSC control program having a logical file structure comprising a public area, a private area, a secure key area, password area, and an unique identifier area. The data objects contained in the public area having no access restrictions, data objects placed into the private area are encrypted and can be accessed by using a password, and the data objects placed into secret key area are encrypted and only accessible by the VSC control program. Each VSC may be addressed by unique identifier (ID). Card holder specific data objects being preferably stored in the same format on a storage media, e.g. database, are transferred into the assigned area of the defined file structure of the VSC by using the VSC control program (personalized VSC). Thus, the personalized VSC as well as their assigned ID and passwords are accessible via the personalization side considering that the access of the IDs and the password is accomplished via a secure channel. At the personalization side, already pre-initialized real smart cards having the same defined logical file structure as their assigned VSCs are personalized by a personalization program reading the data objects of the VSCs and using smart card specific commands for writing the data objects into the EEPROM of the real smart card. An main advantage of the present invention is that the personalization data contained in the VSC may be tested in the application environment before personalized real smart card is already available. Changes to the data objects set can be done without amending the personalization program.

BRIEF DESCRIPTION OF THE DRAWINGS

In the following, an implementation of the invention is described with reference to the drawings, in which.

DETAILED DESCRIPTION OF THE INVENTION

Figure 1:
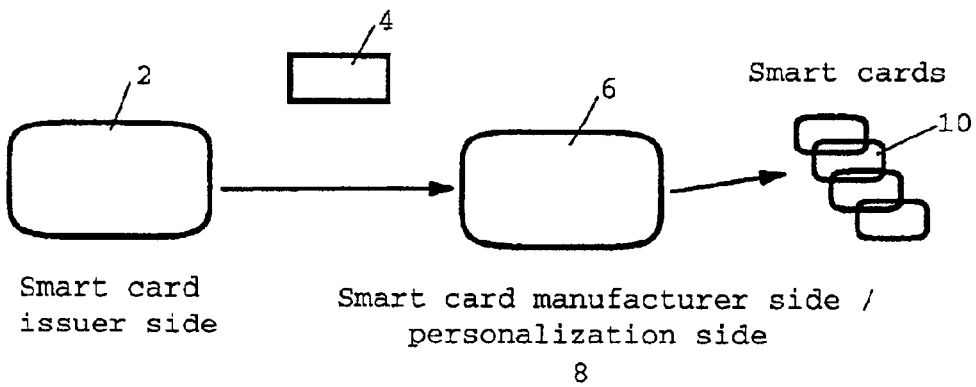
FIG. 1 shows a standard method for personalization of smart cards used in the prior art systems.

FIG. 1 shows the basic method of personalization of smart cards as applied by the prior art personalization systems. Normally, a smart card issuer (2) collects card holder specific data, prepares a personalization record (4) and sends the record (4) to the card manufacturer (8) transferring the personalization records (4) by means of a personalization program (6) into the real smart cards (10).

Figure 2:
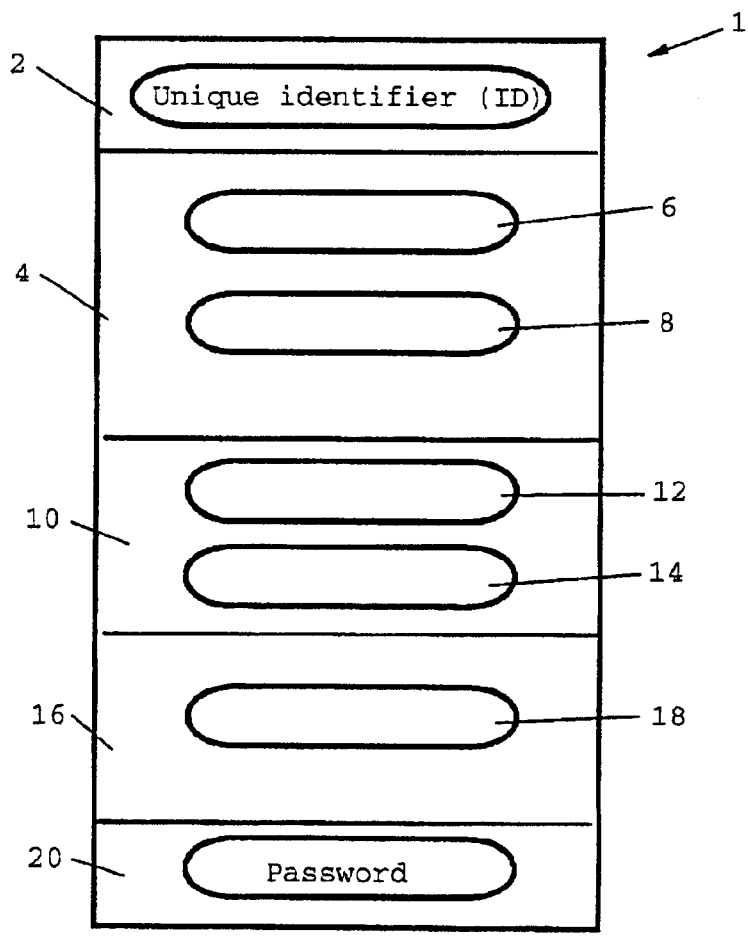
FIG. 2 shows the basic file structure of the virtual smart card (VSC) used by the present invention for personalization of real smart cards.

FIG. 2 shows a logical file structure of a virtual smart card (VSC-1) used for personalization of a real smart card according to the present invention. This VSC (1) is preferably generated at the card issuer side having access to the card holder data objects. However it is not excluded that card holder data objects may be accessed by any other institution. Preferably all card holder data objects are stored on a data base in the same format.

The logical file structure of the VSC(1) is defined by the following data areas:

a public area in which public data objects having no access conditions are placed (4), e.g. Certificate (6) or address (8)

a private area in which private objects being encrypted are placed; private objects may only be accessed providing a password (10), e.g. account no (12) or key information (14).

a secret key area in which key objects being encrypted are placed; key objects are not accessible however they can be used by the VSC control program (16), e.g. private key for signing (18)

a password area in which password being encrypted is placed (20)

a unique identifier area in which an unique identifier for identifying a VSC is placed (2)

Figure 3:
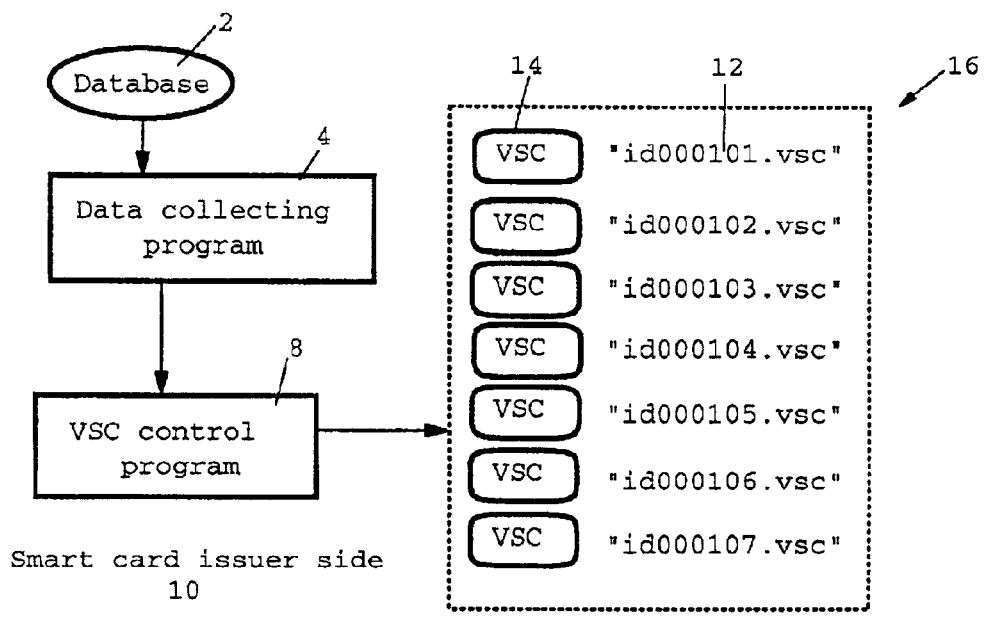
FIG. 3 shows the steps for creating of a virtual smart card at the card issuer side according to the present invention.

The VSC file (1) may be built preferably as a dedicated file with variable length. Within that variable record file, the length of each data area (2,4,10,16,20) can be varying. The unique identifier (2) is preferably contained as part of the file header information. Further header information may be:
type of file
structure of the file
length of the file
access conditions
attribute
file hierarchy FIG. 3 shows the steps for creation a virtual smart card at the card issuer side (10) as shown in FIG. 2 according to the present invention.

The smart card issuer (10) creates a virtual smart (VSC-14) for each card holder and transfers the data objects (e.g. certificates, personal data, keys) into the assigned data areas of the defined VSC file structure (14). The VSC (14) is preferably generated by calling the generate VSC function preferably available in the application programming interface (API) of the VSC control program (8). An unique identifier (12) and a password are transferred as parameters to the assigned defined VSC file structure (14). The VSC control program (8) can generate identical logical file structures with identical length of areas or with areas of varying length depending on the smart card manufacturer request. In any case it must be secured that that each VSC (14) is assigned to a real smart having the same pre-initialized defined file structure. Thus, an import of the VSC data to a real smart card can be guaranteed.

Each VSC (14) is a data file with an unique identifier (12) and has an own password to protect the private data. The card issuer preferably has access to a data collecting program (4) having access to a data base (2) containing card holder data which transfers the cardholder data into the areas of the defined VSC file structure by using the write DataObject function available in the application programming interface of the VSC control program (8).

After the completion of the transfer of data the smart card issuer can test the VSC in the application environment.

After generation of a set of VSC files (16) they are sent to the personalization side or smart card manufacturer via portable storage media or via network. Furthermore, a set of unique identifier and passwords assigned to the set of VSC files are also sent to the smart card manufacturer via a secure channel.

Figure 4:
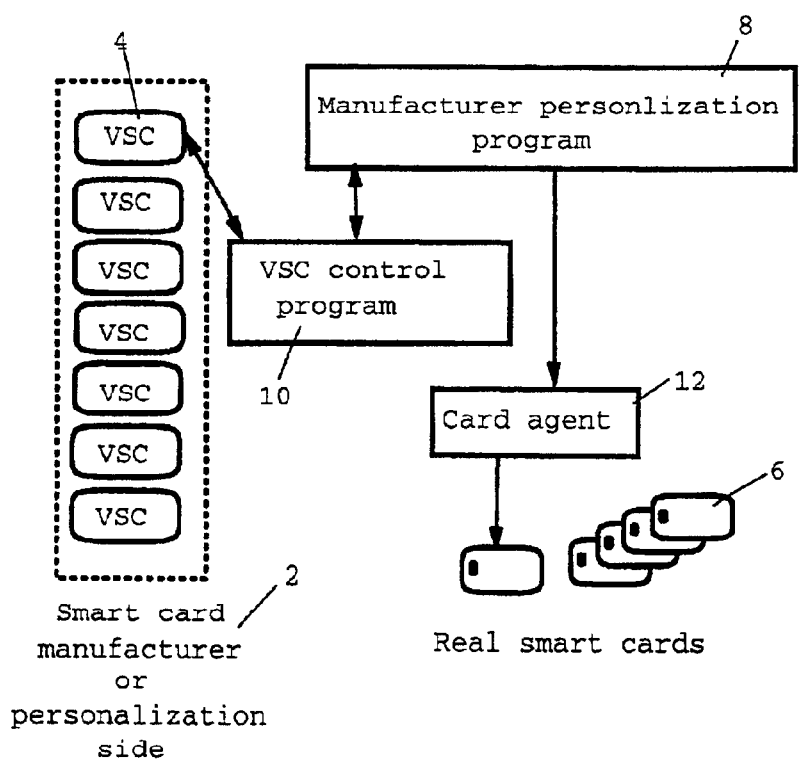
FIG. 4 shows the steps for transferring the data objects contained in the virtual smart card to the real smart card at the personalization side according to the present invention.

FIG. 4 shows the steps for transferring the data objects contained in the virtual smart card to the real smart card at the smart card manufacturer side (2) according to the present invention.

On the personalization or smart card manufacturer side (2) each VSC (4) is transferred to the real smart card(6) using a personalization program (8) preferably having an interface with a VSC control program (10) and a smart card agent program (12) to communicate with the real smart card (6).

Following steps are performed for each real smart card to be personalized:

Personalization program (8) provides password for the assigned VSC (4) using the login function available in the application programming interface of the VSC control program (10). The unique identifier for the VSC (4) and the assigned password are transferred as parameters.

The personalization program (8) reads all data objects placed in the areas of the VSC (4) using the readall DataObjects function available in the application programming interface of the VSC control program (10). The unique identifier of the VSC (4) and a return buffer is passed as parameters.

Get the pre-initialized real smart cards (6) having the same defined file structure as the assigned VSCs (4)

Generation of the respective APDUs by the smart card agent program (12) providing the smart card specific commands for writing the data objects into the real smart card (6)

The generated APDUs are sent via the card reader (not shown) to the real smart card (6) where the smart card operating system is handling the command.

Figure 5:
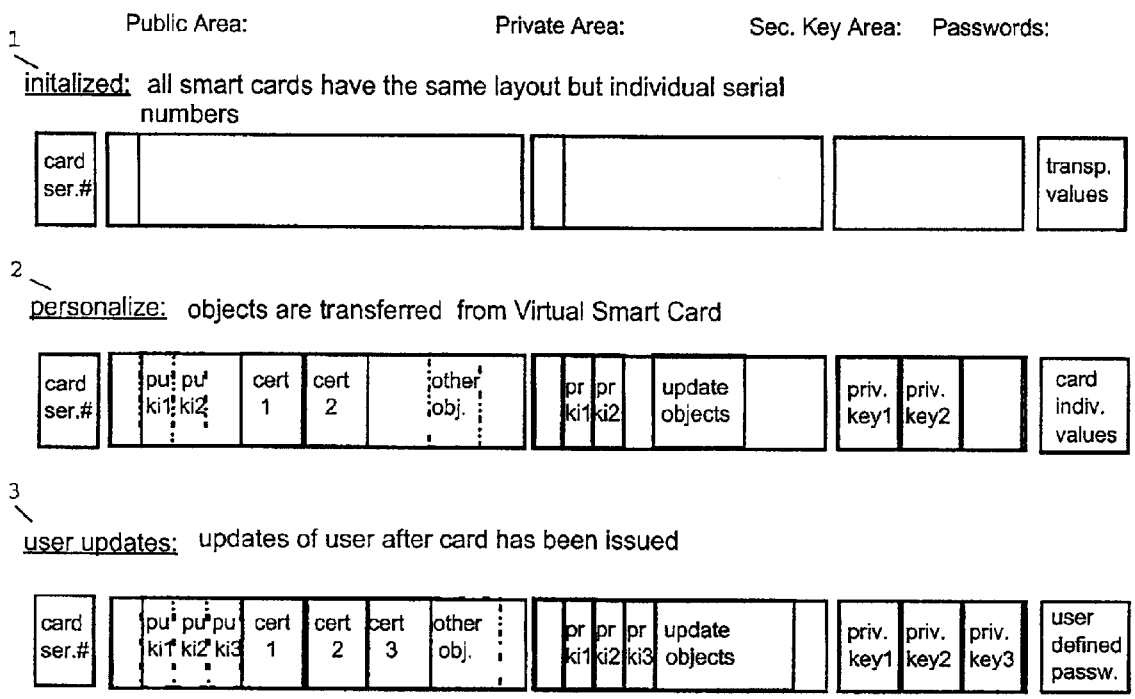
FIG. 5 shows the basic steps for personalization of a real smart card by using a virtual smart card according to the present invention.

FIG. 5 shows the basic steps for personalization of a real smart card by using a virtual smart card at the card manufacturer side according to the present invention.

In a first step (1) a set of real smart cards are pre-initialized with a logical file structure providing following areas of objects: public area, private area, secure key area, password and unique identifier. These pre-intialized real smart cards have the same logical file structure as their assigned VSCs generated and provided by the card issuer. Each real smart card has an unique identifier or card serial number assigned and card password is set to a transport value only known to the card manufacturer. In a second step (2) called personalization step all data objects of a personalized VSC are transferred to the real smart card and the card password is set to an card individual value which will be transferred to the card holder via a secure channel. In a third and last step (3) called card holder update step the card holder has received the real smart card and he has to change the card password and may create additional objects on the card restricted by the length of areas available by the file structure.

Figure 6A:
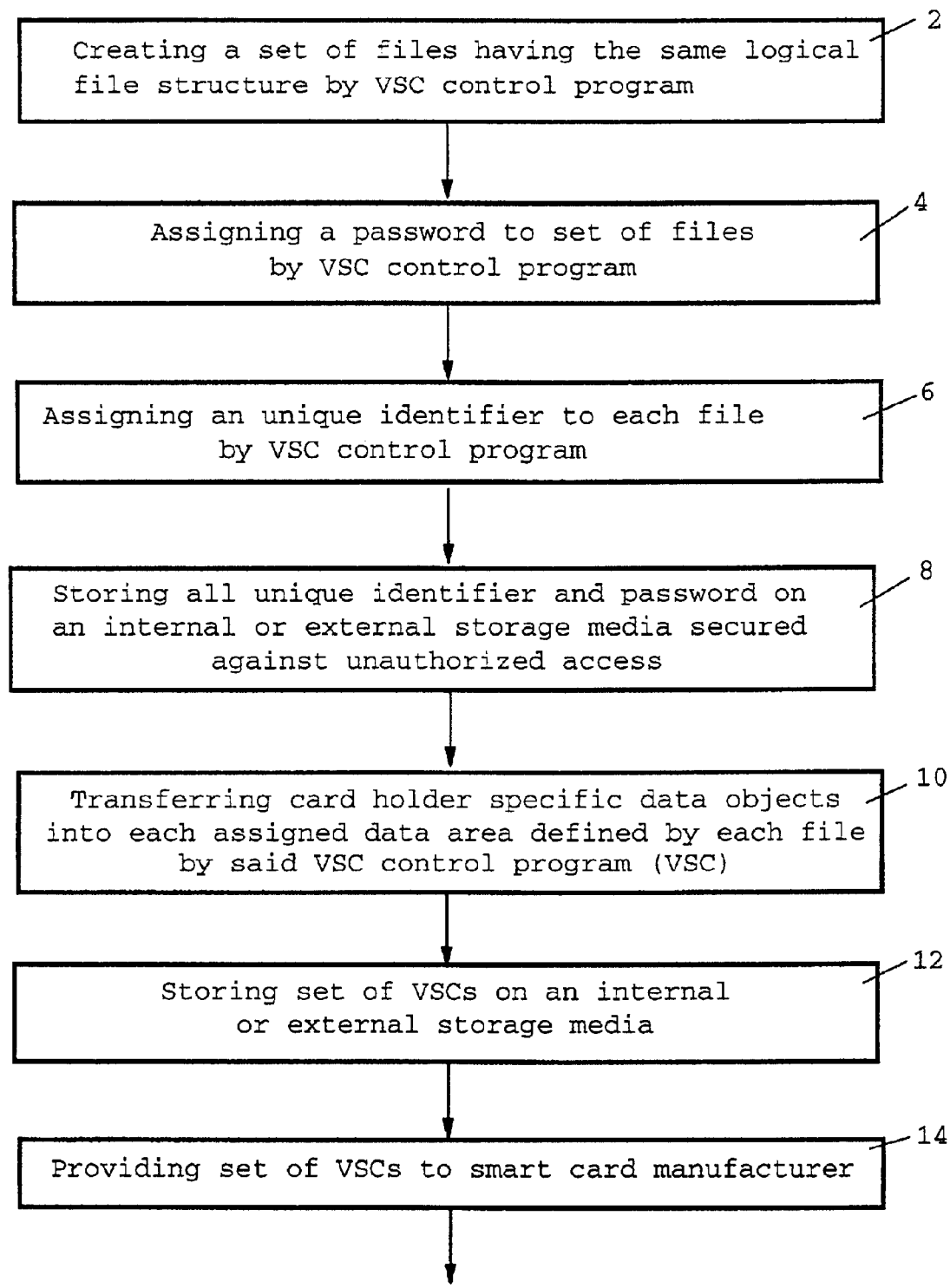
FIG. 6 shows a flow-chart of the overall process of personalization of a real smart card by using a virtual smart card created at the smart card side and transferred to and used at the personalization side according to the present invention.
Figure 6B:
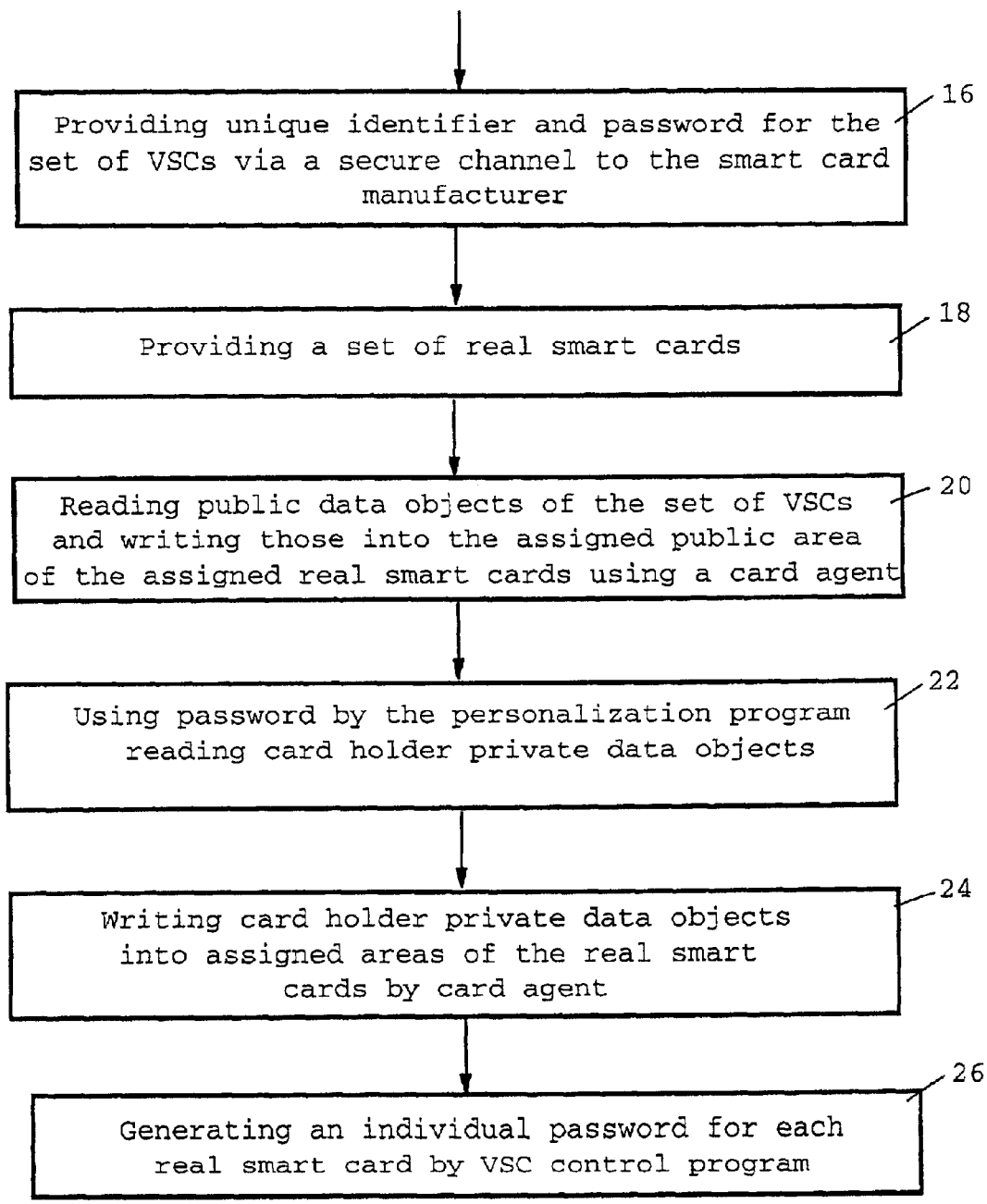

FIGS. 6A–B shows a flow-chart of the overall process of personalization of real smart cards by using a virtual smart card according to the present invention.

The personalization process as taught by the present invention may be divided into two separate process parts namely creation of the virtual smart card with the card holder specific data objects preferably at the card issuer side and transferring the card holder specific data object contained in the virtual smart card into the real smart card preferably at the smart card manufacturer or personalization side.

The creation of the virtual smart card comprising the following steps (FIG. 6A):

Creating of a set of files (virtual smart card or VSCs) having the same logical file structure by a VSC control program. The logical file structure comprising a public area, a private area, a secret key area, password area, and an unique identifier area for addressing the VSC. The length of the areas may vary from each set of files (2).

Assigning a common password to the set of VSCs by said VSC control program (4).

Assigning an unique identifier to each VSC by the VSC control program. The unique identifier allows to address each single VSC (6).

Storing all unique identifier and common password for the set of VSCs on an internal or external storage media being secured against unauthorized access of third parties (8).

Transferring card holder specific data objects into the assigned areas of the set of VSCs by the VSC control program having access to a data base containing card holder specific data.

All private data objects are preferably created in an encrypted form with a message identification code (MAC). This is accomplished by the VSC control program (10).

Storing the set of VSCs containing the card holder specific data objects on a internal or external storage media (12).

Providing a set of VSCs to the smart card manufacturer via network (14).

The personalization of real smart cards via the set of VSCs comprising following steps (FIG. 6B):

Providing a set of real smart cards having a defined logical file structure being identical with the file structure of the set of VSCs according to step 7 and having unique identifiers or serial numbers being identical with the unique identifier or serial numbers assigned to each file of the set of VSCs (18).

Reading the public data objects of the set of VSCs by the VSC and writing those objects into the assigned public area of the EEPROM of the real smart card using a card agent generating the smart card specific commands (20).

Using password by the personalization program and providing it to VSC for reading card holder private data objects (22).

Generating smart card specific APDUs by the card agent for writing the card holder private data objects into the assigned private area of the EEPROM (24).

Generating an individual password for each real smart card and overwriting the common password stored in the real smart card with the individual password (26).

What is claimed:

1. Method for personalization of smart cards characterized by the steps of:
    providing a virtual smart card (VSC) at the personalization side having a data processing system for receiving and/or storing said virtual smart card and reader for establishing communication with a real smart card to be personalized and a personalization program, wherein said virtual smart card having a defined logical file structure being identical with the logical file structure of said real smart card to be personalized and data objects placed in the respective areas of said virtual smart card;
    establishing communications of said real smart card to be personalized with said real smart card to be personalized with said personalization program;
    electronically transferring said data objects contained in said virtual smart card into the assigned areas of said real smart card by said personalization program;
    generating an individual password for said real smart card and replacing said existing password placed in said real smart card by said individual password; and
    providing said individual password to the smart card holder via a secure channel.

2. Method according to claim 1, wherein creation of said virtual smart card comprises the following steps:
    automatically creating a defined file structure having defined areas for placing data objects by a virtual smart card control program;
    automatically assigning a password and an unique identifier to each defined file structure created and storing both in the respective area of said defined file structure by said virtual smart card control program;
    electronically accessing data objects to be placed into the assigned areas by said virtual smart card control program;
    electronically storing said defined file structure including said data objects on a storage media.

3. Method according to claim 1, wherein said defined file structure of said virtual smart card is defined by the following areas:
    a public area in which public data objects having no access conditions are placed;
    a private area in which private data objects being encrypted are placed;
    a password area in which a password being encrypted is placed;
    an unique identifier area in which an unique identifier for identifying the VSC is placed.

4. Method according to claim 3, wherein said defined file structure of said virtual smart card is a dedicated file structure containing elementary files for defining the areas in which said data objects are to be placed.

5. Method according to claim 1, wherein creation of said virtual smart card and their assigned unique identifier is accomplished at smart card issuer side by said virtual smart control program and said virtual smart card including their assigned password and unique identifier are accessible by said data processing system of said personalization side via network wherein access to said password and said unique identifier is secured against unauthorized access.

6. Method according to claim 1, wherein said transfer of data objects from the virtual smart card into the assigned areas of said real smart card comprising the following steps:
    accessing password and unique identifier for assigned virtual scan card by said personalization program;
    loading virtual smart card into the memory of data processing system at the personalization side by using said password via said personalization program;
    reading all data objects placed in said virtual smart card by said placed in said virtual smart card by said personalization program and writing them by means of smart card specific commands into the EEPROM of said real smart card.

7. Method according to claim 6, wherein said loading and reading steps are accomplished by said personalization program using a respective functionally provided by the virtual smart card control program.

8. System for personalization of real smart cards comprising:
    a virtual smart control component for creating virtual smart cards having a defined logical file structure identical with the file structure of the real smart card to be personalized;
    a data base storing information to be used for personalization;
    a collecting program for collecting information to be placed into the respective area of the virtual smart card;
    a personalization program for accessing said virtual smart card and their assigned unique identifier and password and transferring the data objects contained in said virtual smart card by means of said password and card specific commands into the storage area of said real smart card;
    a reader for establishing communication between said real smart card and said personalization program.

9. System according to claim 8, wherein said virtual smart control program, said data base and said collection program are located at the smart card issuer side and said personalization program and said reader are located at the personalization side, wherein said smart card issuer side and said personalization side are connected via a network.

10. System according to claim 8, wherein a further virtual control program is located at the personalization side for providing the read functionally of the virtual smart card to the personalization program when reading the objects of the virtual smart cards.

11. A computer program product stored on computer usable medium for personalization of smart cards comprising:

instructions for providing a virtual smart card (VSC) at the personalization side having a data;

processing system for receiving and/or storing said virtual smart card and reader for establishing communication with a real smart card to be personalized and a personalization program, wherein said virtual smart card having a defined logical file structure being identical with the logical file structure of said real smart card to be personalized and data objects placed in the respective areas of said virtual smart card;

establishing communications of said real smart card to be personalized with said real smart card to be personalized with said personalization program;

electronically transferring said data objects contained in said virtual smart card into the assigned areas of said real smart card by said personalization program;

generating an individual password for said real smart card and replacing said existing password placed in said real smart card by said individual password; and providing said individual password to the smart card holder via a secure channel.

12. Apparatus for personalization of smart cards, the apparatus comprising:

means for providing a virtual smart card (VSC) at the personalization side having a data;

means for processing system for receiving and/or storing said virtual smart card and reader for establishing communication with a real smart card to be personalized and a personalization program, wherein said virtual smart card having a defined logical file structure being identical with the logical file structure of said real smart card to be personalized and data objects placed in the respective areas of said virtual smart card;

means for establishing communications of said real smart card to be personalized with said real smart card to be personalized with said personalization program;

means for electronically transferring said data objects contained in said virtual smart card into the assigned areas of said real smart card by said personalization program;

means for generating an individual password for said real smart card and replacing said existing password placed in said real smart card by said individual password; and means for providing said individual password to the smart card holder via a secure channel.

13. Apparatus according to claim 12, creation means for creating said virtual smart card, wherein the creation means includes:

means for automatically creating a defined file structure having defined areas for placing data objects by a virtual smart card control program;

means for automatically assigning a password and an unique identifier to each defined file structure created and storing both in the respective area of said defined file structure by said virtual smart card control program;

means for electronically accessing data objects to be placed into the assigned areas of said defined file structure and transferring them into said assigned areas by said virtual smart card control program;

means for electronically storing said defined file structure including said data objects on a storage media.

14. Apparatus according to claim 12, wherein said defined file structure of said virtual smart card is defined by the following areas:

a public area in which public data objects having no access conditions are placed;

a private area in which private data objects being encrypted is placed;

an unique identifier area in which an unique identifier for identifying the VSC is placed.

15. Apparatus according to claim 14, wherein said defined file structure of said virtual smart card is a dedicated file structure containing elementary files for defining the areas in which said data objects are to be placed.

16. Apparatus according to claim 12, further comprising transfer means for transferring data objects from the virtual smart card into the assigned areas of said real smart card, the transfer means including:

means for accessing password and unique identifier for assigned virtual smart card by said personalization program;

means for loading virtual smart card into the memory of data processing system at the personalization side by using said password via said personalization program;

means for reading all data objects placed in said virtual smart card by said placed in said virtual smart card by said personalization program and writing them by means of smart card specific commands into the EEPROM of said real smart card.

* * * * *

UNITED STATES PATENT AND TRADEMARK OFFICE
CERTIFICATE OF CORRECTION

PATENT NO. : 6,729,549 B2
DATED : May 4, 2004
INVENTOR(S) : Hamann et al.

It is certified that error appears in the above-identified patent and that said Letters Patent is hereby corrected as shown below:

Column 7,
Line 59, after "assigned areas" insert -- of said defined file structure and transferring them into said assigned areas --.

Column 8,
Line 23, after "virtual" delete "scan" and insert -- smart --.

Column 10,
Line 24, after "encrypted" delete "is" and insert -- are --.
Line 24, after "placed;" begin new paragraph and insert -- a password area in which a password being encrypted is placed: --.

Signed and Sealed this

Twenty-sixth Day of April, 2005

JON W. DUDAS
*Director of the United States Patent and Trademark Office*